United States Patent
Adkins et al.

(10) Patent No.: US 8,756,840 B2
(45) Date of Patent: Jun. 24, 2014

(54) IRON SOLE PLATE

(75) Inventors: George Ralph Adkins, Rotherham (GB); Michael James, Rotherham (GB); Jamie Michael Sellors, Rotherham (GB)

(73) Assignee: Morphy Richards Limited, Rotherham (GB)

( * ) Notice: Subject to any disclaimer, the term of this patent is extended or adjusted under 35 U.S.C. 154(b) by 0 days.

(21) Appl. No.: 13/879,357

(22) PCT Filed: Oct. 27, 2011

(86) PCT No.: PCT/GB2011/001539
§ 371 (c)(1),
(2), (4) Date: Apr. 12, 2013

(87) PCT Pub. No.: WO2012/066270
PCT Pub. Date: May 24, 2012

(65) Prior Publication Data
US 2013/0227864 A1    Sep. 5, 2013

(30) Foreign Application Priority Data

Nov. 17, 2010   (GB) .................................. 1019432.2

(51) Int. Cl.
*D06F 75/38* (2006.01)
*D06F 75/08* (2006.01)

(52) U.S. Cl.
USPC ........................................................ 38/93

(58) Field of Classification Search
USPC .................. 38/74, 75, 79, 80, 81, 88, 93, 97; 219/622, 467, 444.1, 443.1, 451.1; 392/409
See application file for complete search history.

(56) References Cited

U.S. PATENT DOCUMENTS

| | | | | |
|---|---|---|---|---|
| 1,649,506 A * | 11/1927 | Brewer | ........................... | 38/77.6 |
| 2,299,202 A * | 10/1942 | Bass | ............................... | 68/222 |
| 2,357,905 A * | 9/1944 | Olving | ............................... | 38/81 |
| 3,269,040 A * | 8/1966 | Dikoff | ............................... | 38/97 |
| 3,905,138 A * | 9/1975 | Abolafia | ........................... | 38/97 |
| 5,146,700 A * | 9/1992 | Prosser | ........................... | 38/77.9 |
| 6,111,229 A * | 8/2000 | Schultheis | ............... | 219/452.11 |
| 6,138,389 A | 10/2000 | Kanazawa et al. | | |

(Continued)

FOREIGN PATENT DOCUMENTS

| CN | 201598510 U | 10/2010 |
|---|---|---|
| DE | 3800921 A1 | 7/1989 |

(Continued)

OTHER PUBLICATIONS

International Search Report and Written Opinion of the ISA for PCT/GB2011/001539, ISA/EP, Rijswijk, NL, mailed Feb. 10, 2012.

(Continued)

*Primary Examiner* — Ismael Izaguirre
(74) *Attorney, Agent, or Firm* — Harness, Dickey & Pierce, P.L.C.

(57) ABSTRACT

A sole plate assembly for an electric hand iron, said sole plate assembly comprises a metal outer frame member; a metal retaining ring member shaped to fit inside said metal outer frame member; a flat sole glass or ceramic plate member shaped to fit in said metal retaining ring member; and a flexible seal member arranged to locate in said metal retaining ring member. The construction provides for improved ease of assembly, and a robust sole plate construction.

32 Claims, 14 Drawing Sheets

(56) References Cited

U.S. PATENT DOCUMENTS

| | | |
|---|---|---|
| 2008/0235998 A1 | 10/2008 | Yeung et al. |
| 2010/0326977 A1 | 12/2010 | Lee |
| 2012/0061372 A1 | 3/2012 | James et al. |

FOREIGN PATENT DOCUMENTS

| | | |
|---|---|---|
| EP | 0713937 A1 | 5/1996 |
| GB | 2214935 A | 9/1989 |
| GB | 2471042 A | 12/2010 |
| WO | 2008/122562 A1 | 10/2008 |

OTHER PUBLICATIONS

Combined Search and Examination Reports under Sections 17 & 18(3) for parallel UK Patent Application GB1019432.2, UKIPO, issued Mar. 17, 2011.

* cited by examiner

IRON SOLE PLATE

CROSS-REFERENCE TO RELATED APPLICATIONS

This application is a 371 U.S. National Stage of International Application No. PCT/GB2011/001539, filed Oct. 27, 2011. This application claims Priority to United Kingdom Patent Application No. GB 1019432.2, filed Nov. 17, 2010. The disclosures of the above applications are incorporated herein by reference.

FIELD OF THE INVENTION

The present invention relates to hand irons.

BACKGROUND TO THE INVENTION

Conventional electric hand irons comprise a metal sole plate having an electric heating element embedded therein.

Ongoing established objectives for improving an electric hand iron include:

Reducing the weight of the hand iron, thereby reducing user fatigue.
  Improving the ergonomics of the hand iron, thereby increasing the efficiency of ironing and reducing user fatigue.
Improving the aesthetics of a hand iron.
Improving the heating efficiency of the hand iron and its overall efficiency of power consumption.
Improving the reliability of electric hand irons.
Improving the longevity of hand irons
Improving the resistance to accidental breakage.
Improving the ease of manufacture of hand irons
Reducing the production costs.

Whilst the majority of known hand irons have a metal sole plate, the use of a glass or ceramic sole plate has been proposed in the prior art. For example US 2008/0235998 discloses a hand iron having a ceramic glass sole plate which is heated by a thin film heating element.

However, the use of a glass or ceramic sole plate presents a set of additional and different problems to those present by the conventional metal sole plate. The new problems specific to a glass or ceramic sole plate include the following:

Glass or ceramic sole plates are prone to shattering or cracking due to sharp impact on the edges of the sole plate.
Glasses and ceramics are generally less ductile than metals, and therefore cannot easily be drilled or machined after being formed.
Small details are less easy to form in glasses or ceramics than in metals. This restricts the formation of fixing points for attaching a glass sole plate to the remainder of an iron.
Glass or ceramic materials are generally less heat conductive than metals, which means that relatively larger temperature differentials can occur across a glass or ceramic sole plate compared to a metal sole plate. Specific embodiments herein address some of the above problems concerned with the manufacture of an electric hand iron having a glass or ceramic sole plate.

SUMMARY OF THE INVENTION

According to a first aspect of the present invention, there is provided Other aspects are as recited in the claims herein.

According to a first aspect there is provided a sole plate assembly for an electric hand iron, said sole plate assembly comprising:

a metal outer frame member;
a metal retaining ring member shaped to fit inside said metal outer frame member;
a flat sole plate member shaped to fit in said metal retaining ring member; and
a flexible seal member arranged to locate in said metal retaining ring member.

Preferably, the sole plate assembly further comprises an upper cover plate arranged to locate adjacent said flat sole plate member, such as to provide a void space between said sole plate member and said upper cover plate.

Preferably, said cover plate locates on top of said seal member. The seal member may have resilience and be deformable to accommodate the cover plate and/or other components.

Preferably, said metal retaining strip member forms a ring of a shape configured to surround said flat sole plate member.

The metal retaining strip may comprise:

a first substantially flat portion;
a second substantially flat portion spaced apart from said first substantially flat portion; and
an up right portion joining said first and second substantially flat portions together and extending there between.

The second substantially flat portion preferably has a lower face which is arranged in use to be substantially in a same plane as a lower face of said outer metal frame member.

Preferably, the second substantially flat portion of said retaining ring extends inwardly of said upright portion towards a centre of said retaining ring; and when assembled, said sole plate rests on said second flat portion.

The sole plate as claimed in any one of the preceding claims, wherein a lower face of said sole plate is recessed relative to a lower face of said outer frame.

Preferably a lower face of said sole plate is recessed relative to a lower face of said outer frame by a distance in the range 0.3 mm to 1.0 mm, and preferably around 0.4 mm.

Preferably, said metal retaining ring member is configured to fit between said seal member and said outer metal frame member.

Preferably, said seal member locates between said retaining ring and said sole plate member.

Preferably, said seal member comprises a flexible heat resistant material.

Preferably, said seal comprises a silicone rubber material.

Preferably, said seal member has a cross sectional shape comprising:

a first portion, extending in a direction transverse to a main plane of said sole plate; and
a second portion extending in direction transverse to said first portion.

Preferably, said seal member has a substantially "T" shaped cross section.

Preferably, said sole plate member comprises a plurality of thin film heating elements for directly heating said sole plate member.

Said sole plate member preferably has a thickness in the range 3.5 mm to 4.5 mm, and ideally 3.9 mm to 4.1 mm.

The sole plate may comprise a glass plate or a ceramic plate.

Preferably, said sole plate member comprises a plurality of thin film heating elements having dimensions in the range:

width in the range 0.1 mm to 15 mm and preferably in the range 1.0 mm to 5.0 mm; and
thickness: 300 μm to 400 μm.

Preferably, the sole plate member comprises a plurality of substantially transparent heating elements.

According to a second aspect there is provided an electric hand iron comprising a sole plate assembly as claimed in any one of the preceding claims.

Preferably, the sole plate assembly is retained to said body without the need for adhesives.

In one embodiment, the body slides over the sole plate assembly during assembly of the iron and the body is retained to the sole plate by a plurality of engaging protrusions, recesses or lugs which engage with a corresponding set of protrusions, recesses or lugs on the body. The body is then secured to the sole plate assembly by one or a plurality of screws which prevent the sole plate assembly moving relative to the body in a direction along a main plane of the sole plate, and prevents the protrusions, recesses or lugs becoming disengaged.

Preferably the hand iron comprises a body which fits over said sole plate assembly, wherein:

said body comprises a set of one or a plurality of first recesses or protrusions;

said outer frame member comprises a corresponding set of one or a plurality of second recesses or protrusions;

said first set of recesses or protrusions being arranged to engage with said second set of recesses or protrusions to secure said body to said outer frame member;

wherein said retaining ring member, said sole plate member, and said seal member are held together between said outer metal frame and said body.

According to a third aspect there is provided a method of construction of a sole plate assembly for an iron, said method comprising:

inserting a metal retaining strip member into an outer metal frame member;

inserting a flat sole plate member into said metal retaining ring; and inserting a seal member into said outer metal frame member.

Preferably said method comprises inserting said seal member between said retaining ring and said flat sole plate member.

Preferably, said flat sole plate member comprises a plurality of thin film electric heating elements; and said seal member serves to electrically isolate said electric heating elements from said outer metal frame member.

The seal member preferably provides a means to resist shocks and to absorb shock loading whilst the iron is in use.

Preferably, the method further comprises inserting a glass or ceramic cover plate on top of said seal member and above said sole plate member, such that said cover plate is secured above said sole plate member and between said body and said outer frame member.

Preferably, the method further comprises attaching said outer metal frame to an upper body member in such a manner that said upper body member secures said metal retaining strip member, said seal member and said sole plate member together within said outer frame member.

Preferably, the method further comprises sliding said outer metal frame, said metal retaining strip, said sole plate member and said seal into an upper body member, in a direction from a rear of said body member towards a front of said body member.

Other aspects are as set out in the claims herein

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In this specification, there are described hand iron embodiments having a transparent glass sole plate, and a transparent or part transparent upper body. However in other embodiments the sole plate may be constructed of a ceramic material. In yet other embodiments, the sole plate materials need not necessarily be transparent, but could be opaque, and the upper body could also be opaque immediately above the sole plate.

In this specification, there are described embodiments having a transparent semi-conducting metal oxide thin film heating element applied directly to a glass sole plate. However the material of the thin film heating element in other embodiments is not restricted to a transparent thin film, but may comprise opaque heating elements, for example a metal heating track.

In this specification, the term "glass" is used to refer to materials commonly known in the art by that description and including clear transparent and colored transparent glasses, and including, but not limited to amorphous non-crystallized solid materials. The term includes but is not limited to Borosilicate and quartz glasses, and includes plastics or other silica free amorphous solids.

In this specification, the term "ceramic" is to be interpreted as ceramics generally known in the art, and including but not limited to inorganic non-metallic solids prepared by the action of heat and subsequent cooling, having either a crystalline, partly crystalline or amorphous structure.

Figure 1:
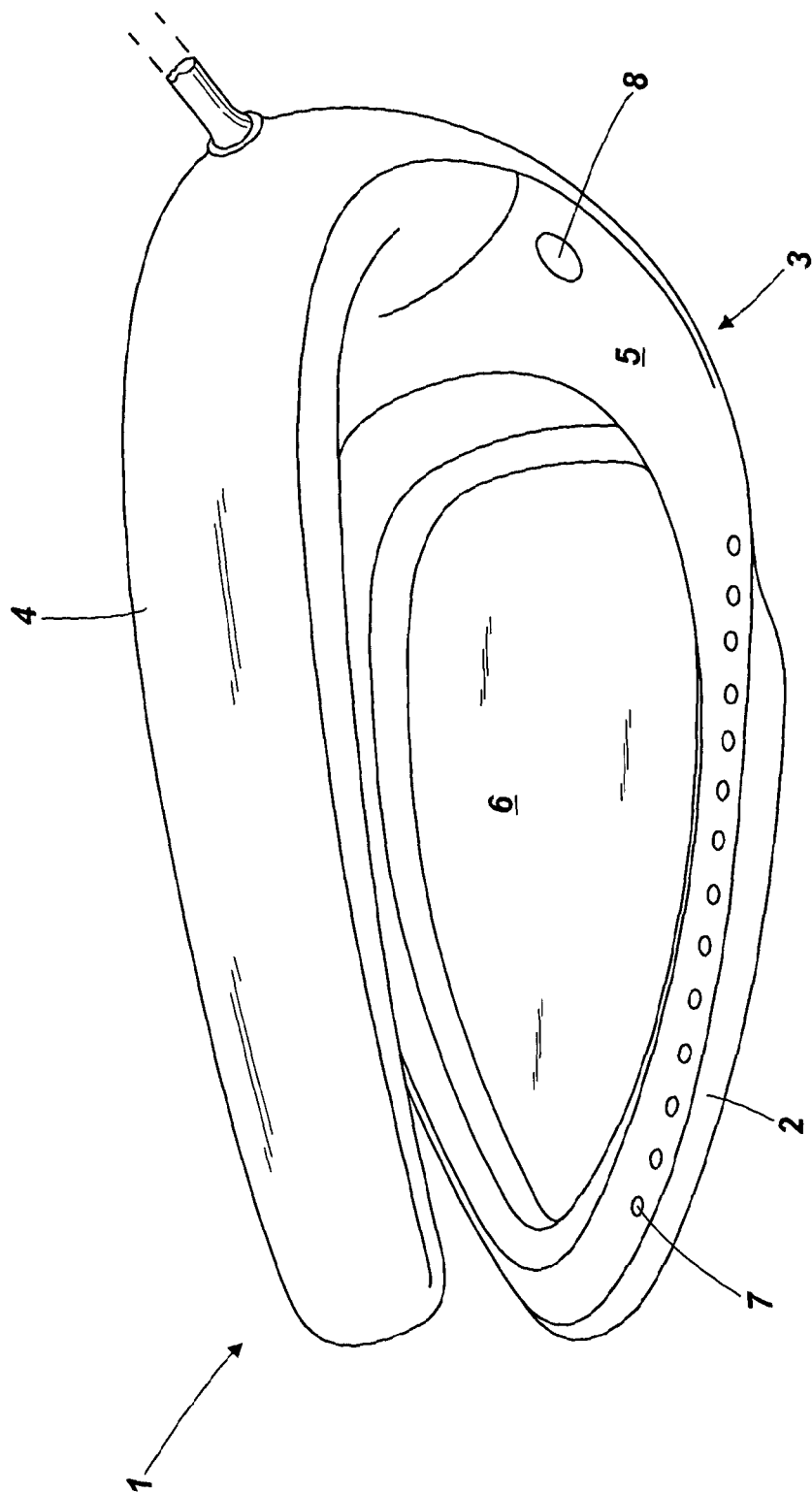
FIG. 1 illustrates schematically in perspective view from above a first hand iron according to a first specific embodiment.

FIG. 1 herein illustrates schematically in perspective view from above a hand iron according to first specific embodiment. The hand iron 1 comprises a sole plate assembly 2 and a body 3. The body 3 comprises a handle 4 formed from an injection molded plastics material, and forming an upper surface of the iron; an opaque molded plastics casing 5 extending around a perimeter of the sole plate; and a transparent or translucent upper cowl or casing component 6 formed of an injected molded material. The plastics material may be for example polycarbonate, or any other suitable plastics material which has sufficient rigidity, ease of forming and temperature resistance for application in irons.

The body may be secured to the sole plate assembly by a series of screws 8, connecting the rear of the body to the rear of the outer metal frame.

Figure 2:
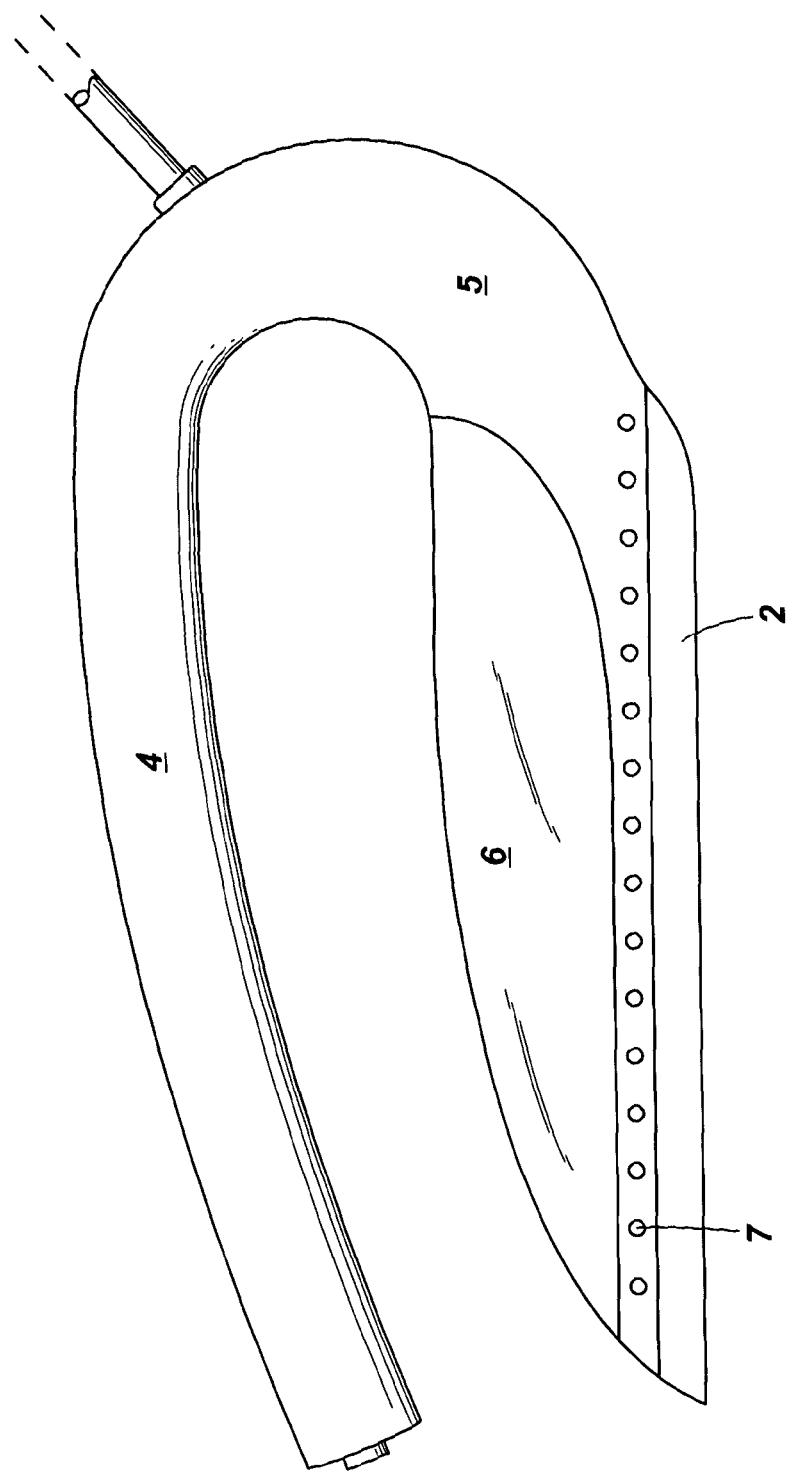
FIG. 2 illustrates schematically the first hand iron of FIG. 1 in view from one side.

Referring to FIG. 2 herein, there is illustrated schematically in view from one side the electric iron of FIG. 1 herein.

The transparent/translucent portion of the sole plate, and the transparent/translucent cowl portion 6 of the body enables the user to see through the main body of the iron to the material being ironed underneath the sole plate.

The sole plate comprises part of a sole plate assembly, in which a lower glass or ceramic sole plate is provided with a covering glass, plastics or ceramic cover plate which performs the function of physically and electrically isolating the heating element from the inside of the iron.

Above the cover plate there is a cavity formed inside the upper casing between the top of the sole plate assembly, and the transparent/translucent upper cowl 6. In various embodiments this cavity may be open to outside atmospheric air via one or a plurality of lateral vents 7 at a base of the casing and immediately above the metal outer frame of the sole plate, or in other variants, the cavity may be sealed and filled with an inert gas such as argon, or filled with a clear transparent or clear coloured gas.

The hand iron further comprises internally, an electric heating element for heating the sole plate; a thermal protection switch for turning off the iron in the event of dangerous overheating; an on/off switch; a temperature selection switch, and an air fan positioned at the rear or heel of the iron. The air fan is positioned internally inside the body of the iron and draws in air from an air inlet vent at the heel of the iron. The air is urged out of a plurality of the first plurality of air outlets 8 positioned at a rearward portion of the upper casing 6, and/or at a second plurality of air outlets 9 which are positioned inside the body of the iron in the cavity formed between the upper casing 6 and an upper surface of the sole plate.

Figure 3:
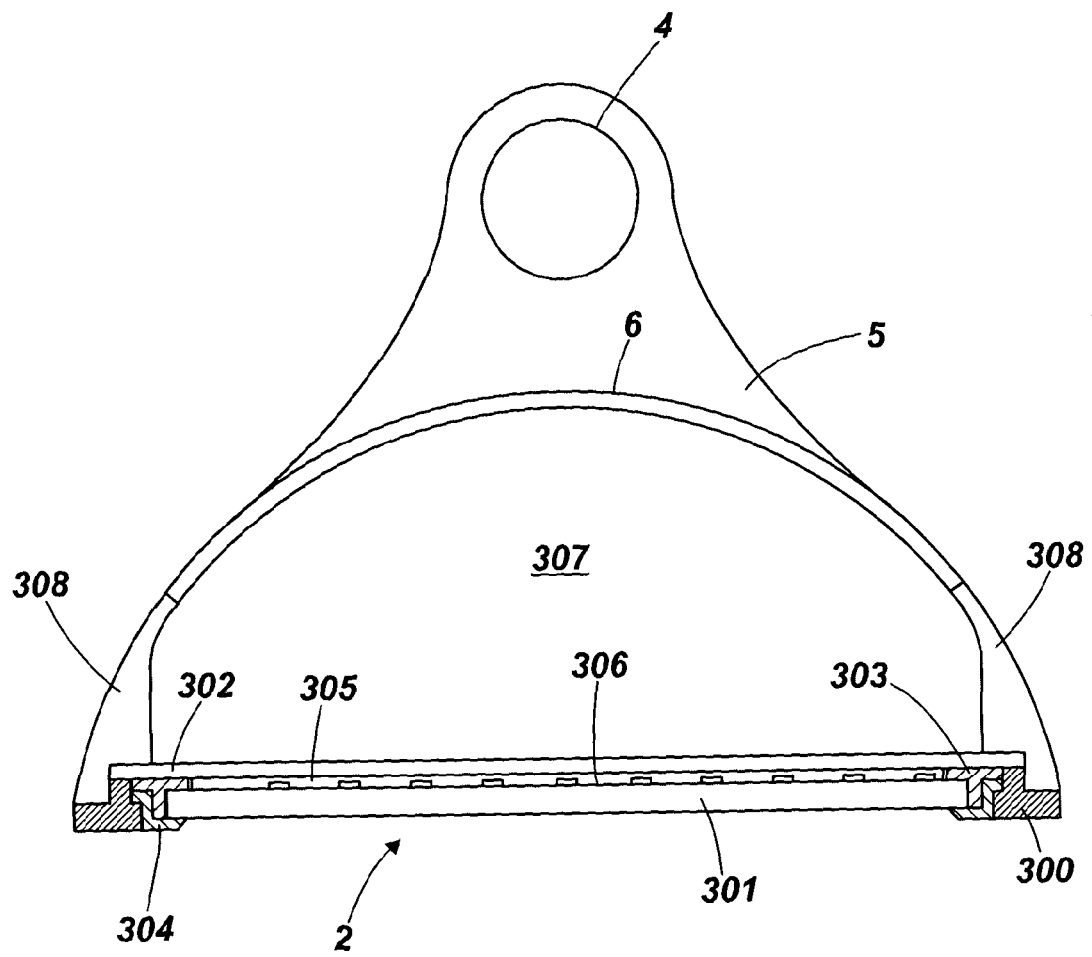
FIG. 3 illustrates in cut away view from the front of the first hand iron, a body and sole plate assembly of the iron of FIG. 1.

Referring to FIG. 3 herein there is shown in cut away view from the front of the iron the casing and sole plate assembly.

The sole plate assembly 2 comprises a peripheral outer frame member 300 of metal, e.g. aluminium, and an inner glass plate assembly. The outer frame comprises a hollow sole plate shaped or boat shaped ring of metal, having a smooth flat under surface which contacts a fabric to be ironed. The outer metal frame member extends around an outside of the inner transparent or translucent glass or ceramic sole plate assembly.

The inner glass or ceramic plate assembly comprises a lower glass or ceramic plate 301 having a smooth under surface, which in use is the portion which is in direct contact with a fabric or garment to be ironed, and an upper cover plate member 302, also of glass or ceramic material which is spaced apart from and parallel to the lower plate member, there being a gap there between, The upper and lower plates may be connected around their edges by a sealing member 303, so as to form a sealed sole plate assembly which is impervious to the ingress of gas from outside. The sealing member sits in a metal strip or ring retaining member 304, which rests on an inner ledge of the outer metal frame member 300, and extends inwardly into an aperture in the centre of the outer metal frame member. The sealing member is preferably resilient and/or deformable so that it provides a degree of cushioning to the sole plate member within the retaining strip, which helps the sole plate absorb without breaking, and also provides some cushioning of the cover plate, also to absorb shock. The sealing member may provide both physical isolation of the sole plate member and the cover member form the outer metal frame. The lower sole plate rests on top of an inner ledge of the retaining ring member, so that the sole plate is inset from the lower most fabric contacting flat surface of the outer metal frame member and the lower most surface of the retaining ring by a distance of 0.3 to 1.0 mm, and preferably around 0.4 mm.

The space 305 between the two plates may be filled with an inert clear or transparent gas for example argon. The gas in the space between the two parallel plates may be pressurized at above atmospheric pressure.

The lower glass or ceramic plate is patterned on its upper surface with a thin film semiconductor heating element 306. When electrical power is applied to the thin film heating element, the element becomes hot and transfers heat to the glass or ceramic lower sole plate 301, so that heat can be transferred from the lower glass sole plate directly to a garment or fabric to be ironed.

Above the sole plate assembly 2 is the cavity 307 and upper cowl 6, bounded by the opaque casing sides 308. In the embodiment shown, both the sole plate assembly and the upper cowl are transparent and so it is possible to see through the iron in a vertical direction from a position above the iron down to the material under the sole plate. Both the upper and lower plates of the sole plate assembly, and the thin film heating element are transparent and can be seen through.

Figure 4:
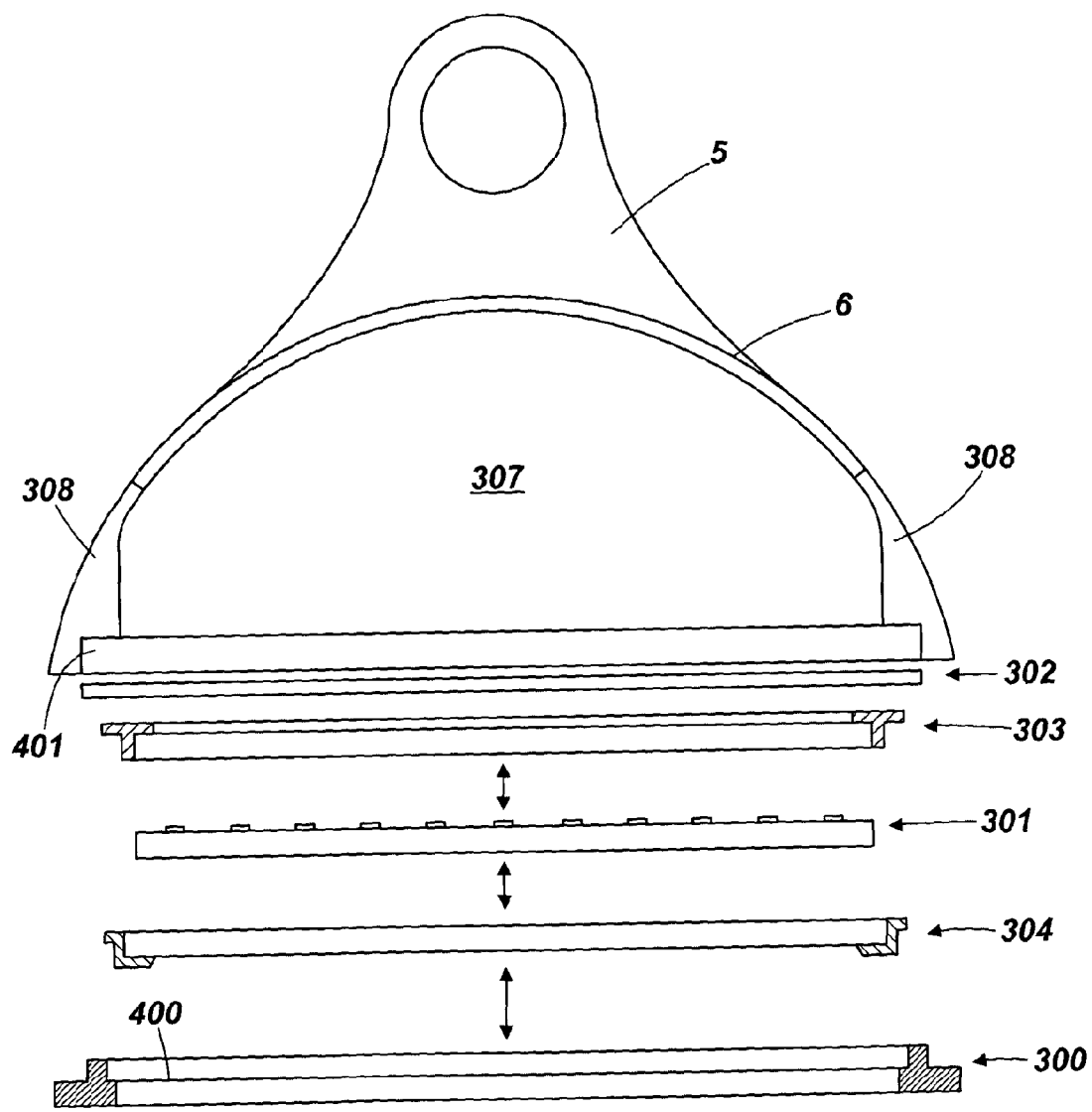
FIG. 4 illustrates schematically in exploded view components of the body and sole plate assembly of the first hand iron of FIG. 1 herein.

Referring to FIG. 4 herein, there is illustrated schematically in exploded cut away view from the front components of the iron of FIGS. 1 to 3 herein, illustrating a method of assembly of the iron.

A metal retaining component 304 in the form of a strip or ring, is shaped so as to fit into the hollow arcuate or curved sole plate shaped metal frame member 300. The metal retaining piece drops into the metal frame and sits upon an upper 400 ledge of the frame. The retaining piece may comprise a single continuous loop or formed metal or a strip of metal formed into a ring or loop to match an external shape of the sole plate.

The lower glass or ceramic sole plate 301 is shaped to sit inside the metal retaining ring 304, and to locate therein loosely, there being a horizontal gap of 0.3 mm to 1.0 mm, and preferably around 0.4 mm all the way around the glass lower plate between the lower plate and the metal frame member 300. The retaining ring member may be formed from a single piece of metal for example by stamping the component from stainless steel, or from a lower grade of steel which may optionally may be chrome plated.

A resilient flexible heat resistant silicone seal member 303, has a cross sectional shape comprising an upright portion, abutting with a lateral portion extending across and to either side of the upright portion so as to make a "T" shape. In view form above, the silicone seal member is an arcuate sole plate shaped ring having two opposite arcuate sides, joining at a frontal tip, and a rear connecting portion extending between and connecting a rear most part of the two arcuate side portions. The silicone seal is formed as a single piece, for example by molding.

The upright extending part of the silicone sealing ring locates in the gap between the retaining ring 304 and the sole plate 301, so that the silicone seal drops, slides, or can be forced into the gap between the glass or ceramic lower heating sole plate 401 and the retaining ring 304, such that the silicone seal locates the lower plate in the retaining ring securely. To promote heat transfer between the retaining ring 304, the glass lower plate 301, the silicone seal 303 and the outer metal frame part 300 of the sole plate assembly, heat conducting paste may be smeared onto the edges of the glass lower plate, the retaining ring, and in the gap to be filled by the silicone locating ring 303, such that in use heat from the heated lower glass or ceramic plate 301 can transfer to the outer metal frame 300.

On top of the metal frame, retaining ring, glass heating plate and silicone locating ring, may be placed the upper glass or ceramic cover plate 302, which is also generally boat shaped to match the sole plate.

The above components may be secured together by upper edges 308 of the upper casing which has a recessed shoulder 401 which locates on top of a perimeter of the upper glass or ceramic plate 302 so as to press down the upper plate onto the silicone sealing ring, and retain the silicone sealing ring in the metal retaining ring 304.

The outer edges of the casing of the iron may fit over the metal frame so as to compress the metal frame 300 the retaining ring 304, the lower glass/ceramic plate 301, the silicone seal 303 and the upper glass/ceramic plate together. The edges of the upper casing may have one or more recesses, grooves or protrusions which locate with respective opposite protrusions recesses or grooves on the metal frame 300 to fit the sole plate assembly together and retain the sole plate assembly to the upper casing.

Assembly of the sole plate to the body is as follows:
The metal retaining ring is dropped into the outer metal frame.
The glass or ceramic sole plate is dropped or placed in the metal retaining ring.
The flexible silicone seal is inserted in the gap around the edge of the sole plate between the sole plate and the retaining ring.
The cover plate is placed on top of the silicone seal.
The outer frame, retaining ring, sole plate, sealing ring and cover plate are slid horizontally into the body of the iron from the rear of the iron, such that the groove in the casing engages the ridge or rim around the outer frame.
Two or more retaining screws 8 are slid through the body into a pair of tapped holes in the rear of the outer metal frame which are positioned underneath the body and tightened, so as to secure the rear of the frame to the rear of the body, and prevent the sole plate assembly becoming detached form the body.

During assembly, if the void between the upper and lower glass/ceramic, and/or the cavity between the sole plate assembly and the upper casing is to have an inert gas introduced, then the assembly sequence must be done in an inert gas atmosphere, for example in a chamber containing such a gas.

Figure 5:
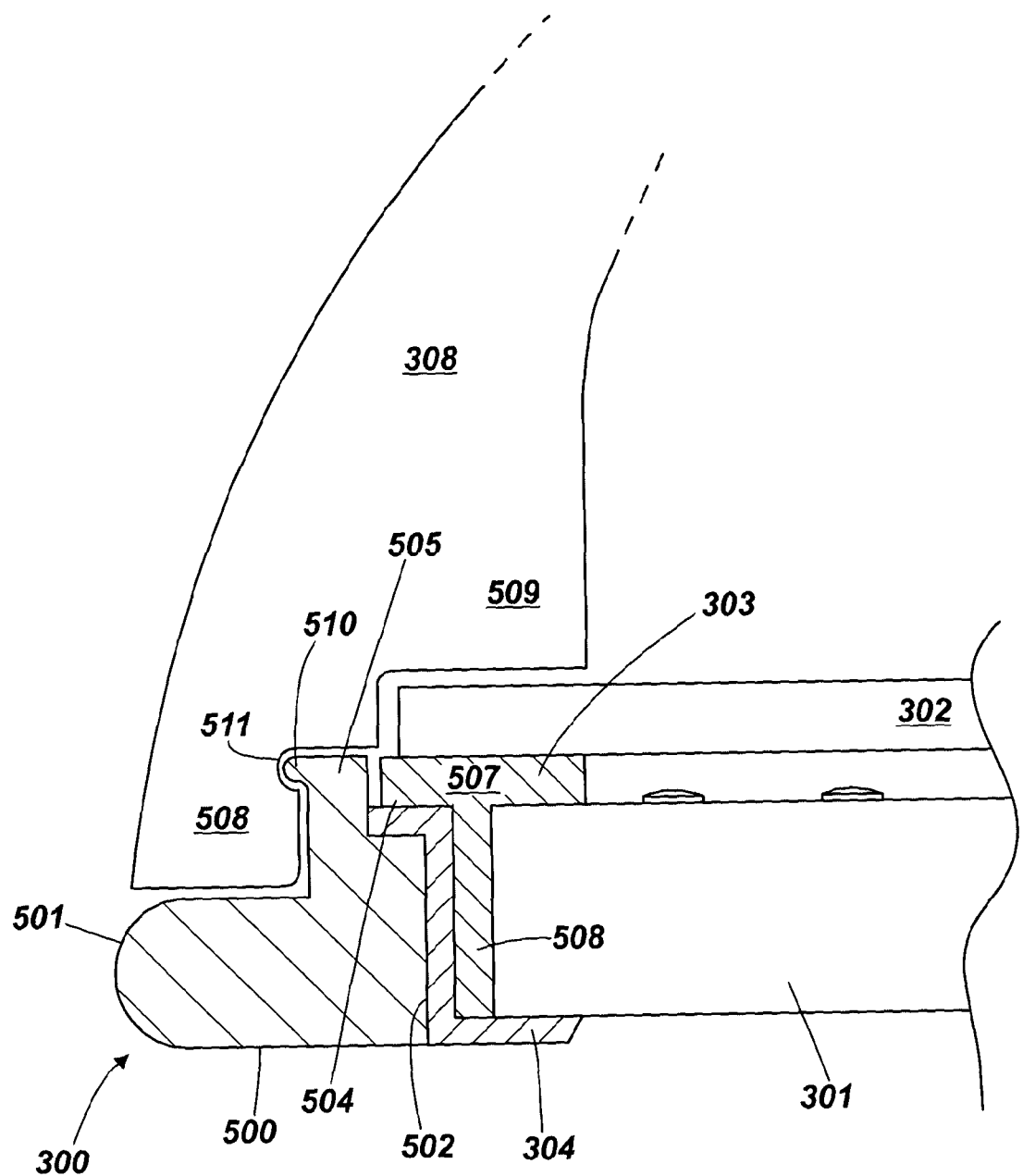
FIG. 5 illustrates schematically a detail of a cross sectional view of one side of the sole plate assembly and a lower part of the body of the first hand iron of FIG. 1 herein.

Referring to FIG. 5 herein, there is shown in detailed cut away view the connection between the sole plate assembly and the body of the iron at one side of the iron.

The outer frame 300, which is preferably made of aluminium or a like material, in cross sectional profile comprises a main body portion having a flat lower garment contacting surface 500, at one side, a rounded edge 501, at an opposite side a flat upright inner face 502, the flat upright face leading to an internally facing peripheral ledge 503, on which the retaining ring 304 rests, and adjacent the ledge, an upright wall portion 505 which is inset with respect to the outer edge 501 and the inner edge face 502.

The retaining ring 304 comprises a first substantially flat planar upper portion, which sits on top of the ledge 504 of the outer frame; a second substantially flat planar lower portioned spaced apart from the first substantially flat planar upper portion, the lower portion extending into the aperture surrounded by the outer frame member, and an upright connecting portion joining said first and second substantially flat planar portions together and extending there between, when assembled, the upright connecting portion lying adjacent the inner face 502 of the outer frame 300. Preferably, the retaining ring is made of metal of thickness in the range 0.2 mm to 0.3 mm.

The seal member 303 is substantially boat shaped in view from above, having in cross sectional view, an upright portion 506 which one said of which contacts the inwardly facing surface 502 of the retaining, and another side of which contacts an outward peripheral edge of the lower sole plate 301. The upright portion is connected with a flat upper cap portion 506 which extends across the top of the upright portion and overhangs on each side of the upper portion. An inner under surface of the inner most overhanging portion contacts an upper surface of the sole plate 301. An under surface of the outer overhanging portion rests on top of the substantially flat upper portion of the retaining ring, which in turn sits on top of the ledge 504 of the outer frame.

The casing 308 fits on top of the sole plate assembly, an outer peripheral flange portion 508 of the casing extending downwardly at the side of the upright wall portion 505 of the outer frame, and a heel portion 509 of the casing pressing down on the cover plate 302, the seal member 303, and the retaining ring 504, and compressing the whole sole plate assembly.

A peripheral ridge or lip 510 formed on the side of the outer frame 300, engages a corresponding recess or channel in the casing so that as the body is slid over the sole plate assembly in a direction from the front towards the rear of the sole plate, the sides of the casing lock the sole plate components together. The rear of the outer frame may be secured to the body by a pair of downwardly extending screws which pass through the casing and prevent the sole plate assembly from sliding out of the grooves in the body in a direction forward of the body.

In an alternative arrangement, the casing may have a plurality of apertures surrounded by flat material, which engage a plurality of projecting finger like lugs or protrusions on the metal frame of the sole late assembly, so that as the casing is slid forward on the sole plate assembly during manufacture, the projections/protrusions on the sole plate assembly engage the perimeters of the apertures in a sliding motion, which may lightly compress the casing down on the "T" shaped portion of the seal. The casing may be prevented from disengaging the sole plate by a plurality of screws inserted at the rear of the casing which secure the casing to the sole plate, the screws passing through the casing and into a rear portion of the metal frame of the sole plate assembly, so the glass sole plate is constrained within the frame, the retaining ring and the seal, and the frame is secured to the casing. This construction avoids the need for any adhesive to bond the resilient flexible seal to the glass or to the outer metal sole plate frame or retaining ring, and keeps all components locked in place securely.

In the United Kingdom, hand irons need to pass various tests according to British Standard BS EN 60335. These tests include an impact test in which a ball bearing is impacted on the hand iron at a vulnerable point, and a drop test, in which the iron is dropped.

In order to pass these tests, a glass sole plate needs to be mechanically robust, which leads towards having a relatively thicker glass sole plate. On the other hand, since glass has a relatively high thermal latency compared to metal, the thicker the glass plate, the longer the glass takes to heat up, and the slower is the response time of the glass when a surface of the glass is cooled, for example by contact with clothing or wet clothing. There is therefore a trade off to be made between robustness and thermal performance of the glass sole plate.

Using the above method of construction, it has been experimentally found that a relatively thinner glass sole plate can be used, which gives a similar robustness and drop test resistance/impact resistance to a relatively thicker glass sole plate, where the thicker glass plate is bonded to the metal outer frame using adhesive. Therefore, an advantage of improved thermal performance can be obtained using a thinner glass plate for the same or similar impact resistance and drop test resistance for a thicker glass plate where the thicker glass plate is bonded to the outer metal frame using an adhesive. For example, a glass sole plate of thickness 4 mm may be used with a flexible seal seating to the frame, whereas without a flexible seal seating, a glass thickness of 1 or 2 mm thicker, i.e. 5 mm or 6 mm may be needed to achieve the same robustness.

In a preferred embodiment, a glass sole plate of thickness in the range 3.5 to 4.5 mm and preferably in the range 3.9 mm to 4.1 mm is used.

Figure 6:
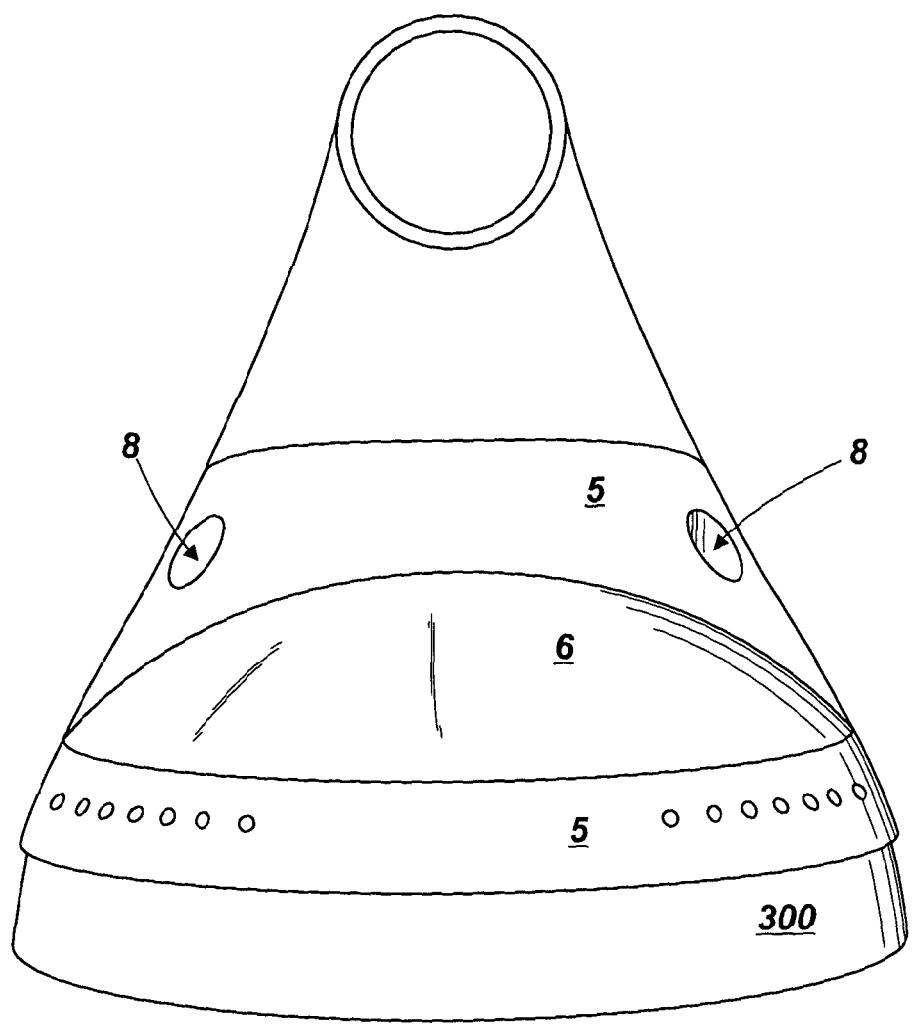
FIG. 6 illustrates view from the front, the assembled first hand iron.

Referring to FIG. 6 herein, there is shown in view from the front, the assembled hand iron. The rear retaining screws 8 fit into recessed channels at the rear of the casing 5.

Figure 7:
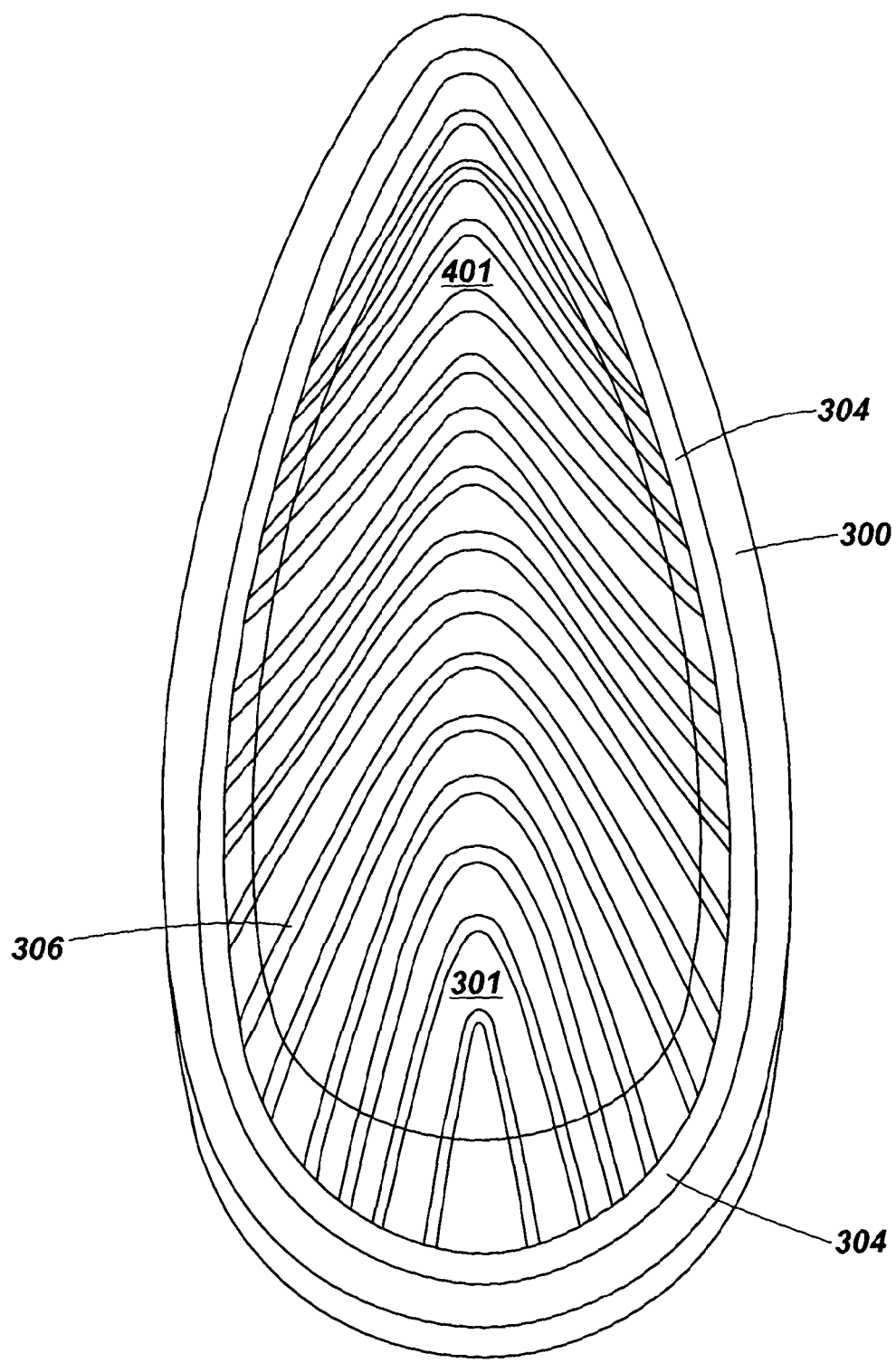
FIG. 7 illustrates schematically in view from underneath, a sole plate of the first hand iron of FIG. 1 herein.

Referring to FIG. 7 herein, there is illustrated the iron in view from underneath, showing the transparent sole plate.

The sole plate assembly 2 comprises a metal perimeter surround 300; a central glass sole plate 301; a metal retaining ring 304 positioned between the glass sole plate and the outer metal frame; and a silicone gasket sealing strip or ring (not shown) positioned between the glass sole plate 301 and the metal retaining ring 304.

The glass sole plate is patterned with a plurality of metal oxide semi-conductor heating elements 306 arranged in rib-like tracks across a width of the transparent glass plate 301. The heating element tracks 306 are patterned towards the rear of the sole plate so as to give a substantially uniform power density across the glass sole plate, so as to ensure a substantially uniform heating of the glass sole plate. At the front of the sole plate, the spacing, dimensions and layout of the heating elements may be arranged to give a slightly higher heating capacity per unit area, since the tip of the sole plate can cool more rapidly than the rear of the sole plate, due to the extra energy needed to evaporate dampness in the fabric, as the tip of the sole plate generally comes into contact with the fabric before the rear of the sole plate in normal ironing, as the iron moves in a forward direction.

Between the glass/ceramic sole plate and the outer metal frame is the retaining ring 304, which presents a smooth flat lower surface which in use contacts the material being ironed. The smooth flat surface of the retaining ring 304 is flush with and on the same plane as the smooth flat lower surface of the outer frame member 300, but the main area of the sole plate is recessed in a vertical direction, by a distance of around 0.3 mm to 1.0 mm, and preferably around 0.4 mm, so that if dropped the iron will impact on the outer frame 300 in preference to the glass sole plate and the iron is therefore more robustly constructed.

In preferred embodiments, the width of the heating element tracks are preferably of the order of 1.0 mm and 5.0 mm, but track patterns could be designed using track widths in the range 0.1 mm to 15 mm. The thickness of the thin film material is preferably in the range 300 μm to 400 μm and the length of the tracks, depending on the width of the sole plate at any distance along the sole plate is in the range 3 cm to 22 cm. The overall power of the heating elements and the output power of the iron is in the range 900 to 1,100 Watts.

Figure 8:
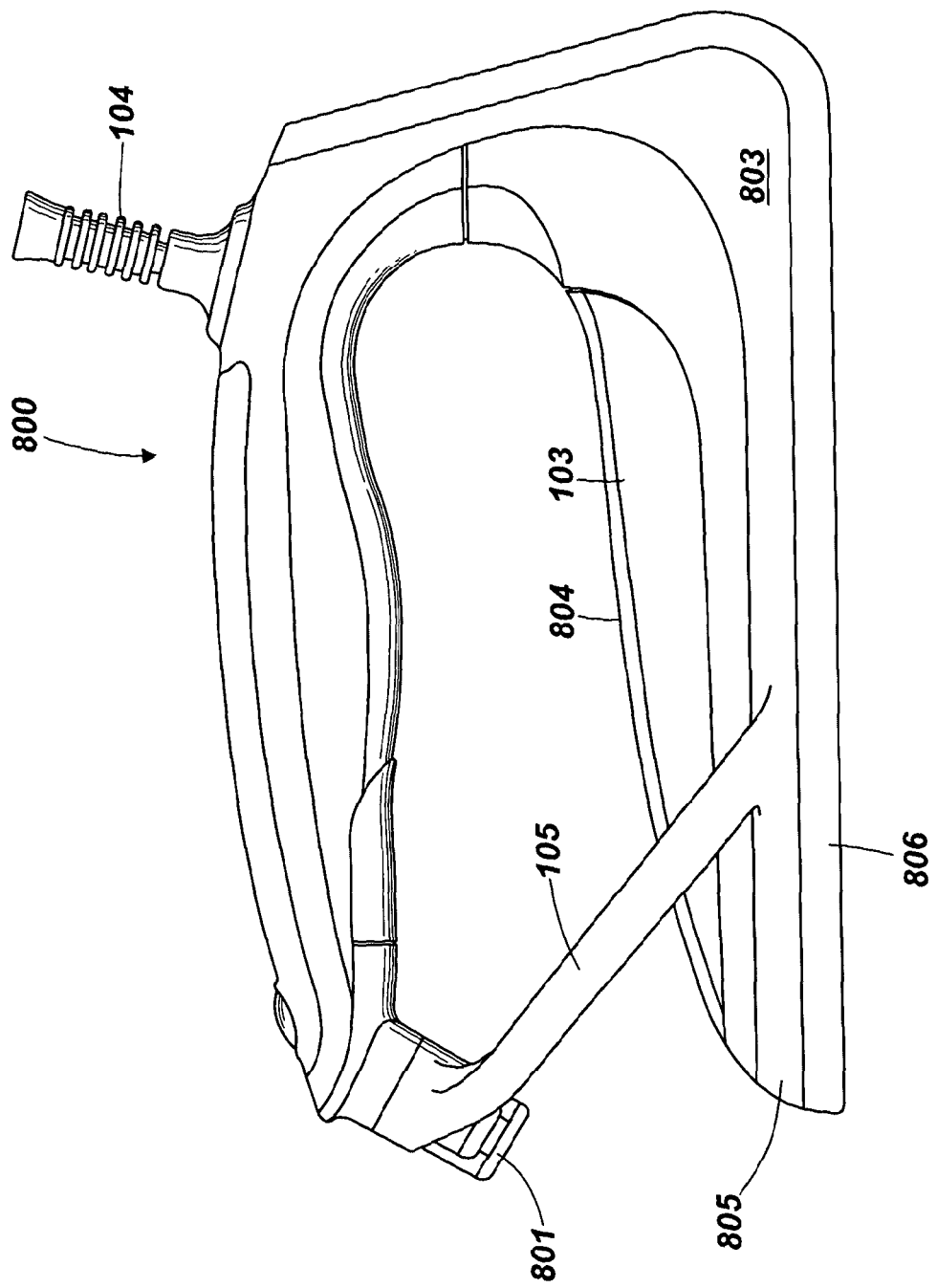
FIG. 8 illustrates schematically in view form one side a second hand iron according to a second specific embodiment.

Referring to FIG. 8 herein, there is illustrated in view from one side a second iron according to a second specific embodiment herein.

The second hand iron 800 comprises all of the features of the first hand iron referred to in FIGS. 1 to 6 herein, and the main body of the second hand iron is assembled to the sole plate assembly in similar manner as for the first hand iron. The second hand iron comprises a water outlet nozzle 801 at a front portion of the handle of the iron, and the front of the handle is supported by a pair of spars or struts 802, extending one on each side of the iron between the lower casing of the iron and the front of the handle, to give the body of the iron greater strength and resistance to compression in the vertical direction.

The second hand iron has a body 803 having a transparent upper cowl 804 above an opaque perimeter casing 805 which extends above and around a sole plate assembly 806.

In particular, the second iron uses the same ranges of heating element track widths, heating element patterns, component materials, and sole plate assembly construction as the first embodiment iron described herein above.

Figure 9:
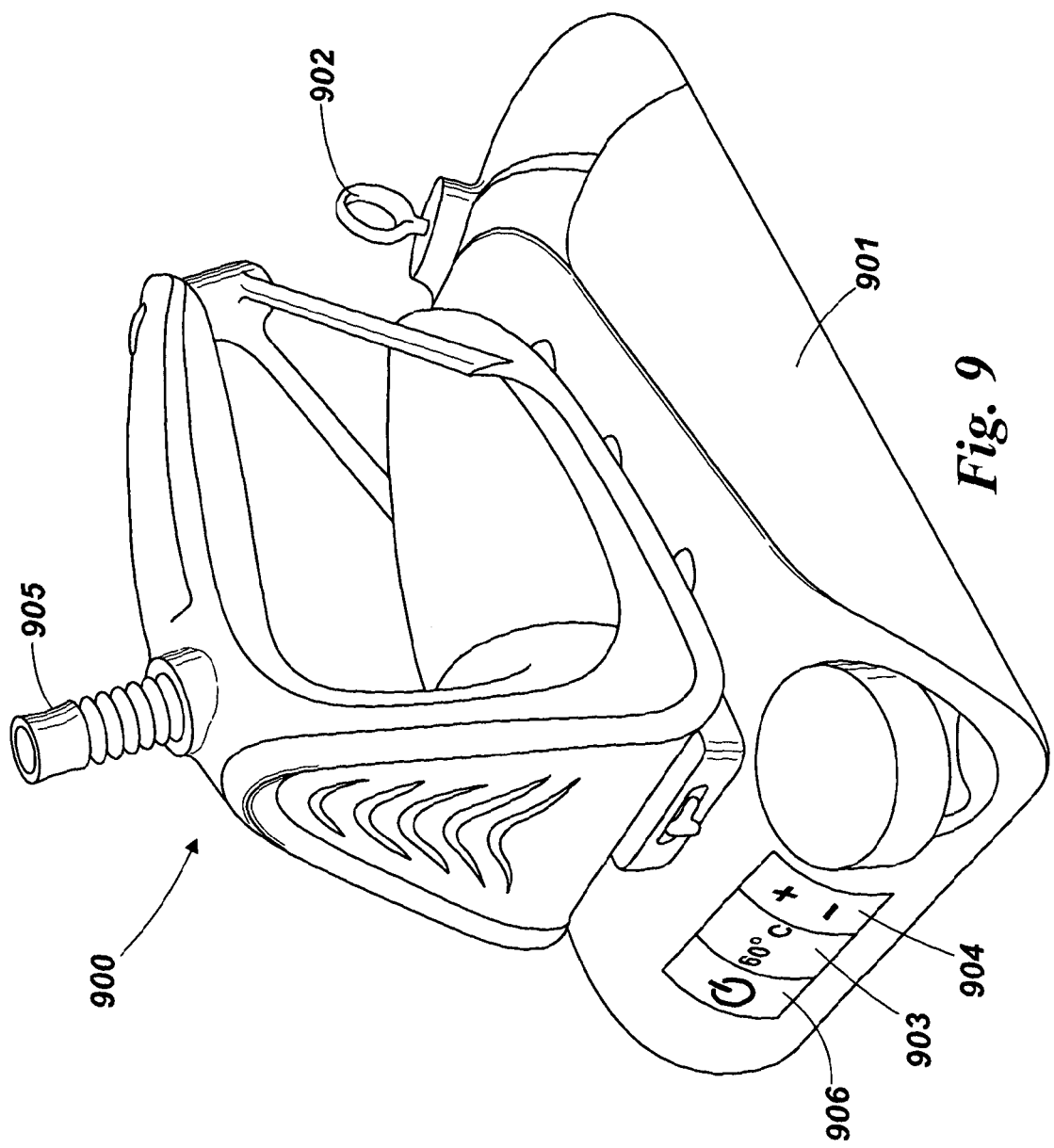
FIG. 9 herein illustrates schematically in view from behind, a third embodiment hand iron and water station according to a third specific embodiment.

Referring to FIG. 9 herein, there is illustrated an electric hand iron and water station according to a third specific embodiment.

The hand iron 900 comprises all of the features of the second hand iron referred to in FIG. 8 herein. The hand iron receives water from a separate water station 901.

The water station 901 comprises a removable reservoir for storing water, a filler cap 902 for enabling the reservoir to be filled, a water filter which can be permanent or removable for cleaning; a display/control panel 903 at the rear of the base station for controlling the temperature of the iron, and for switching the iron between "ON" and "STANDBY" modes; a control circuit and power supply for supplying power to the hand iron, a mains plug 904 and cable for connecting to a mains power supply, and an umbilical cord 905 connecting the hand iron to the water station, the umbilical cord having a flexible water delivery tube, for example of rubber material, and an electrical power supply cable for supplying power to the electric hand iron.

The control/display device 903 comprises a touch sensitive control surface for raising of lowering the temperature of the iron, a display device such as a liquid crystal display for displaying the temperature of the iron, and an on/standby selector for placing the iron between "ON" and "STANDBY" modes of operation.

In some embodiments, the metal heating element tracks may be concentrated towards the tip of the iron, so as to give a slightly higher power density in the tip region. A relatively higher power density at the tip region may be required, since in normal ironing, the tip of the iron generally encounters any moisture on the clothing to be ironed first before the central and rear portions of the sole plate, and therefore is subjected to greater heat dissipation due to evaporation or vaporization of water in the garment.

The above method of construction has a manufacturing advantage compared to the alternative of a glass sole plate bonded to an outer metal frame using adhesive. After manufacture of the glass sole plate, using a bonded construction, in order for the adhesive to bond reliably to the outer metal frame, the edges of the glass sole plate must be kept meticulously clean and free of grease or other contaminants. This can be potentially problematic where the glass sole plate is manufacturer at a different factory to the assembly factory, since the glass sole plates can become contaminated during packing, during transit or during unpacking.

Using the method described herein above, the requirement for the glass sole plates to be kept meticulously clean is less stringent that using glass sole plate which are intended to be bonded to the metal frame. Compared with the alternative of bonding the glass sole plate directly to the outer metal frame, the presently described method of construction may provide a more reliable method of construction.

Further, assembly of the sole plate is simple and easily automated, and avoids the use of any adhesives.

In yet other embodiments, the casing may be manufactured from a clear transparent plastics material such as polycarbonate.

Figure 10:
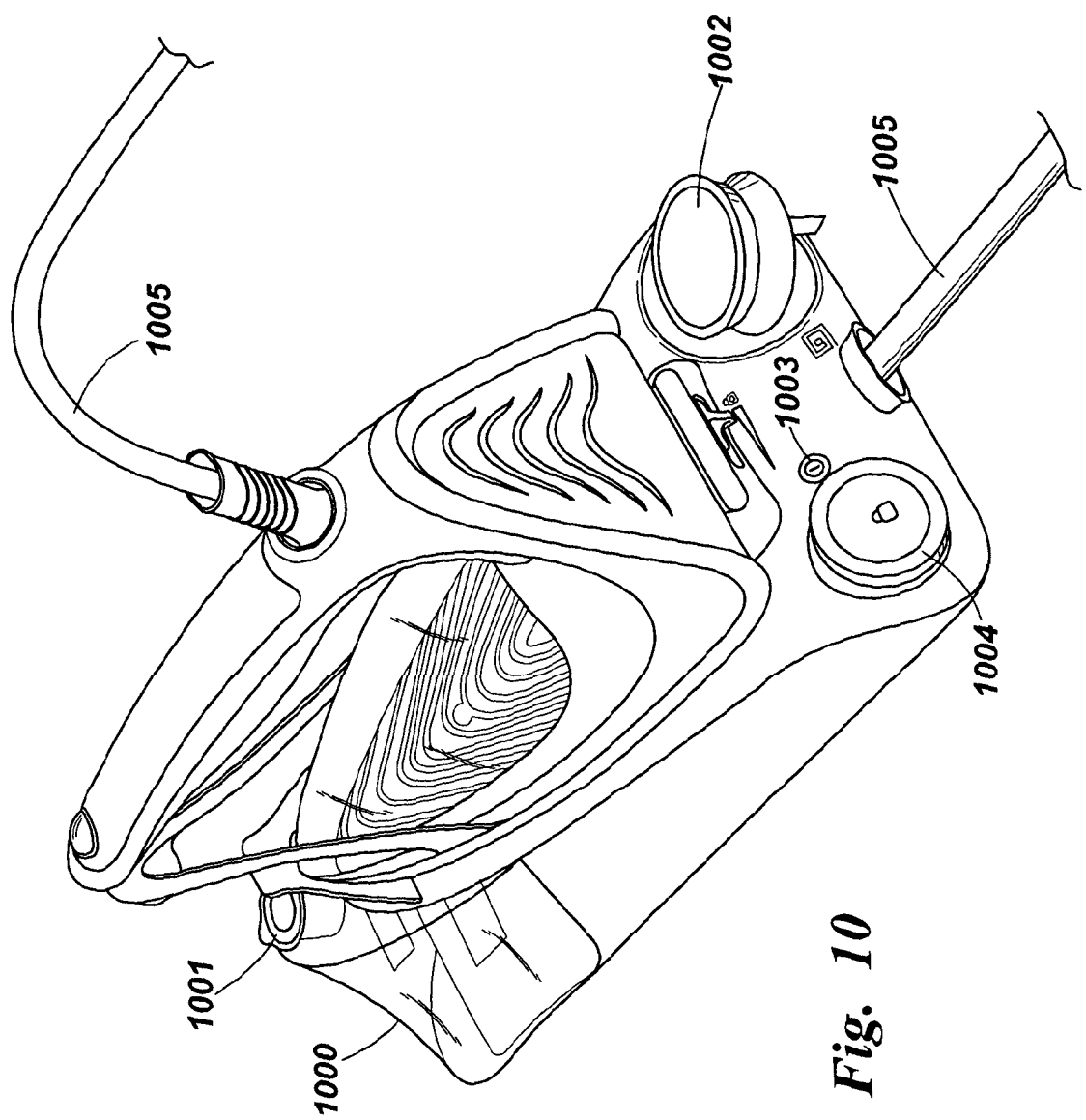
FIG. 10 herein illustrates schematically in view from behind and above, a fourth embodiment hand iron and water station according to a fourth specific embodiment.

Referring to FIG. 10 herein there is illustrated schematically in view from the rear a fourth embodiment hand iron with water station according to a fourth specific embodiment. The fourth hand iron has all the features of the third hand iron, as herein before described. The fourth embodiment water station has a transparent or translucent removable water tank 1000 at the front of the unit; having a filler cap 1001. At the rear of the water station is a mains plug 1002, with associated mains electrical cable, which can be stored in a cavity opening at the rear of the water station. In this embodiment, the temperature is controlled by a rotary temperature knob 1003, and the ON/STANDBY mode selection is by a push button control 1004.

The iron and water station are connected together by an umbilical cord 1005.

Figure 11:
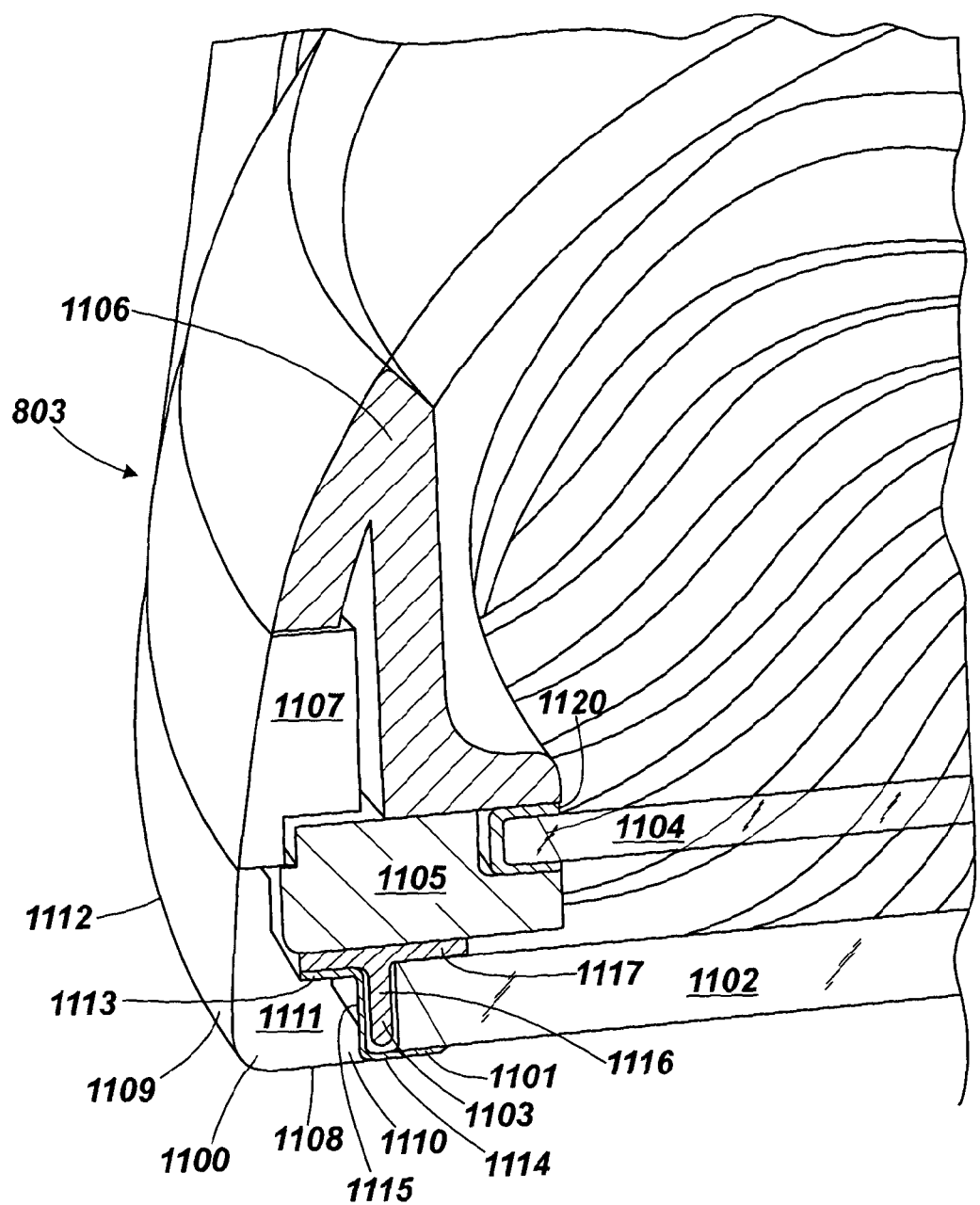
FIG. 11 illustrates schematically a detail of a cross sectional view of one side of a sole plate assembly and a lower part of a body of the third and fourth embodiment irons of FIGS. 9 and 10.

Referring to FIG. 11 herein, there is shown in detailed cut away view the connection between the sole plate assembly and the body of the iron at one side of the iron.

The sole plate assembly comprises an outer frame 1100; a retaining ring 1101 positioned within the outer frame; a transparent glass sole plate 1102 located within the retaining ring 1101; a boat shaped resilient flexible seal 1103 located between the retaining ring and the glass sole plate, for isolating the glass sole plate from the metal outer frame 1100; and covering a gap.

The body 803 comprises outer casing 805, one side only of which is shown in FIG. 11, which is generally symmetrical about a central fore—aft axis, of the iron. The casing may be formed form two separate parts, an upper casing portion 1106 and a lower casing portion 1107; which may have different color plastic, or different surface finishes to each other.

During assembly, the lower part of the casing slides over an upper face of the frame in a direction along a main length of the iron, so that a plurality of engaging members on the frame engage a corresponding plurality of engaging members on the casing to retain the casing to the frame and to secure all components of the sole plate assembly to the casing. The casing is prevented from disengaging the frame by a plurality of screws which pass through the casing and which screw into a portion of the frame.

The outer frame 1100, which is preferably made of aluminium or a like material, in cross sectional profile comprises a main body portion having a flat lower garment contacting surface 1108; at an outer periphery, a rounded edge 1109, at an opposite side and immediately adjacent the retaining ring, a flat upright inner face 1110, an upper surface 1111 and an upwardly extending side wall 1112 which extends around the front and sides of the iron.

The retaining ring 1101 comprises a first substantially flat planar upper portion 1113, which sits on top of the upper surface of the frame; a second substantially flat planar lower portion 1114 spaced apart from the first substantially flat planar upper portion, the lower portion extending into the aperture surrounded by the outer frame member, and an upright connecting portion 1115 joining said first and second substantially flat planar portions together and extending therebetween. When assembled, the upright connecting portion lies adjacent the inner face 1110 of the outer frame. Preferably, the retaining ring is made of metal of thickness in the range 0.2 mm to 0.3 mm.

The seal member 1103 is substantially boat shaped in view from above, having in cross sectional view from the horizontal direction, an upright portion 1116 of which one side contacts the inwardly facing surface 1110 of the retaining ring, and another side of which contacts an outward peripheral edge of the lower glass sole plate 1102. The upright portion is connected with a flat upper cap portion 1117 which extends across the top of the upright portion and overhangs on each side of the upper portion. An inner under surface of the inner most overhanging portion contacts an upper surface of the sole plate. An opposite under surface of the outer overhanging portion rests on top of the substantially flat upper portion of the retaining ring, which in turn sits on top of the upper surface of the outer frame.

The casing fits on top of the sole plate assembly, a heel portion of the casing pressing down on the seal member 1103, and the retaining ring 1101, and compressing the whole sole plate assembly.

The rear of the outer frame may be secured to the body by a pair of downwardly extending screws which pass through the casing and prevent the sole plate assembly from sliding out of the grooves in the body in a direction forward of the body.

In a preferred embodiment, a glass sole plate of thickness in the range 3.5 mm to 4.5 mm and preferably in the range 3.9 mm to 4.1 mm is used. The glass cover plate 1104 may have a thickness in the range 2 mm to 3 mm, and the plastic upper cowl 6 may have a thickness in the range 2 mm to 3 mm.

The sole plate assembly and body are assembled by dropping the retaining ring 1101 into the frame 1100, placing the glass sole plate 1102 into the retaining ring, and locating the seal 1103 in the space between the retaining ring and the glass sole plate.

The upper part of the iron comprising the casing 803, including upper casing portion 1106, lower casing portion 1107 and a spacer ring 1105, the glass cover plate 1104 and the "U" shaped plastics resilient seal 1120 is slid relative to the sole plate assembly including the frame, seal, sole plate and retaining plate so that the casing locks to the frame member by a plurality of locking means, and the ring member 1105 presses down on the seal 1103, holding the sole plate 1102 in place in the outer frame 1100.

The frame is then secured to the body by a plurality of screws passing through the casing to engage the frame.

Figure 12:
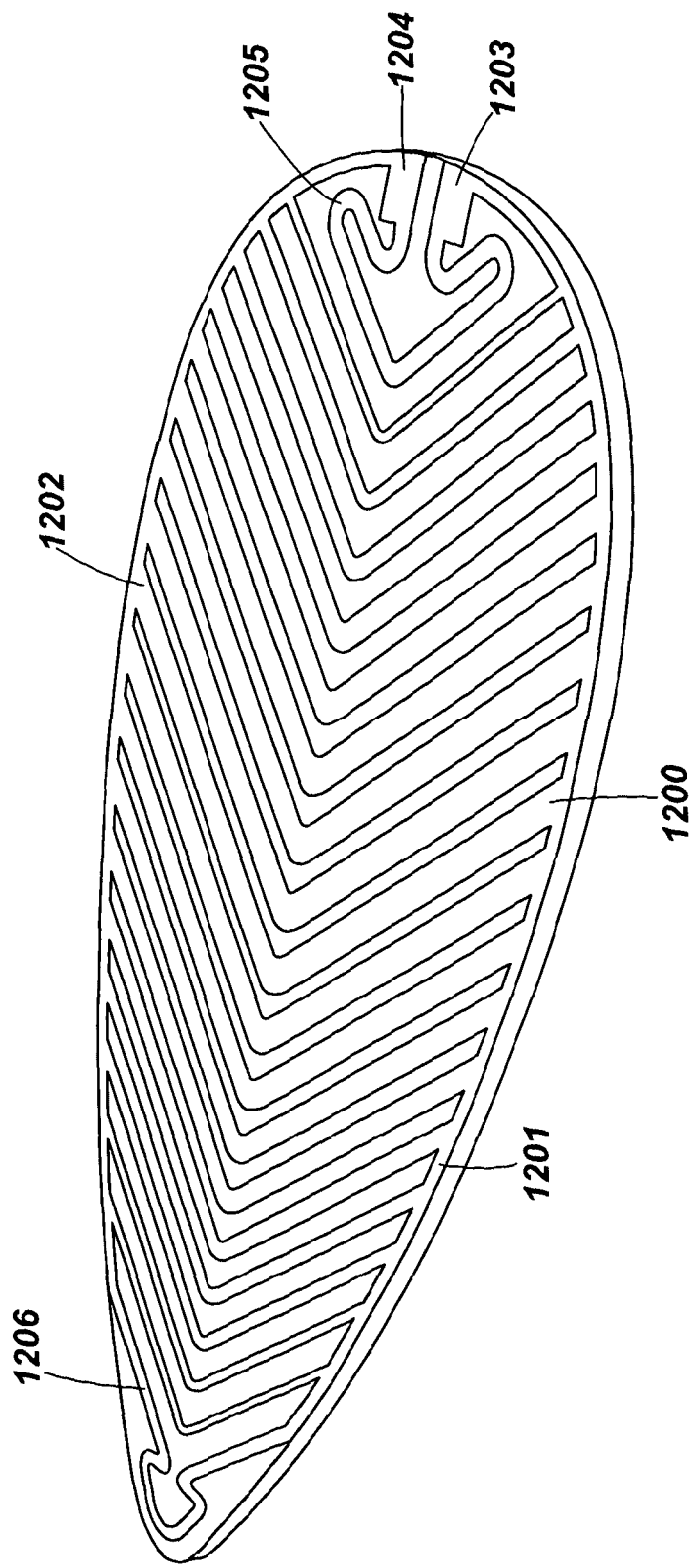
FIG. 12 illustrates schematically in view from above a glass sole plate according to a fifth specific embodiment, having a chevron patterned thin film heating element.

Referring to FIG. 12 herein, there is illustrated schematically in view from above, a glass sole plate according to a fifth specific embodiment. The glass sole plate comprises a plurality of chevron shaped thin film heating element tracks 1200. Each individual track extends between a first power rail track 1201 on a first side of the sole plate, and a second power rail track 1202 on a second side of the sole plate, the first and second power rails being positioned adjacent a perimeter edge of the sole plate, so that the individual heating element tracks extend across a width of the sole plate. At the rear of the sole plate are provided first and second electrical contacts 1203, 1204 for the first and second power rails respectively, being regions of increased area or "pads" to which electrical contact may be made.

At the rear of the sole plate, the two electrical contact pads are connected by a substantially arrow shaped heating track 1205, and at the front of the sole plate, a leading heating element track 1206 has its tip formed into an arrow shape, so as to give extra coverage of the tip region of the glass sole plate. The individual widths of the heating element tracks may be varied from the tip to the rear of the sole plate, so as to give a designed power output and power density on the sole plate to achieve either uniform heating of the sole plate, or heating of the sole plate which is slightly increased towards the tip of the sole plate so as to provide additional energy at the tip to compensate for the additional energy required for evaporating water nearer the front of the sole than at the rear of the sole plate.

In the best mode, the heating elements have a film thickness in the range 300 μm to 400 μm, and track widths in the range 0.1 mm to 15 mm.

Figure 13:
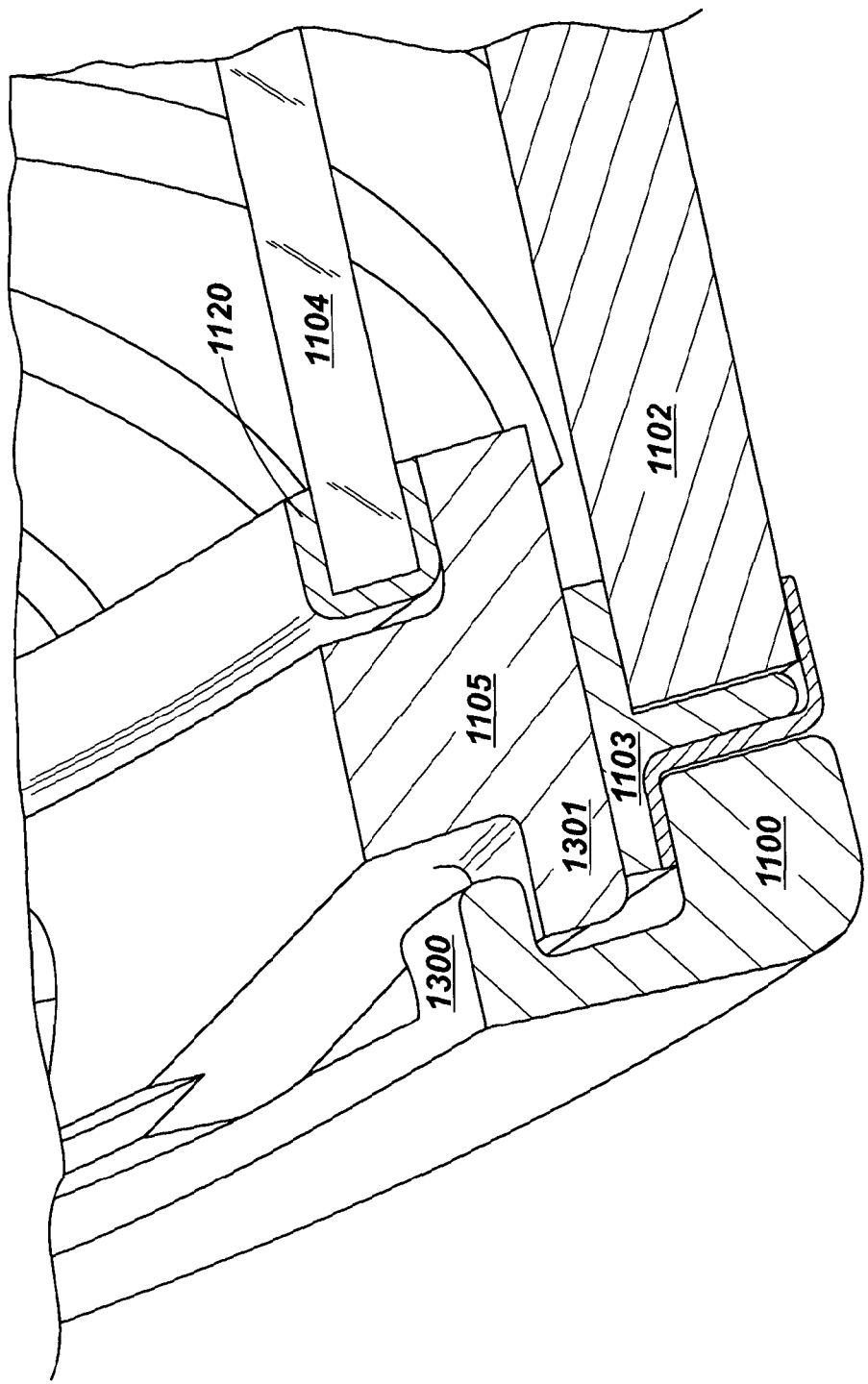
FIG. 13 illustrates schematically in cut away view form one side a portion of a body and frame of an iron as described herein, showing engaging means for securing the frame to the body.

Referring to FIG. 13 herein, there is illustrated schematically in cut away view the sole plate assembly and part of the upper casing, showing connection of the upper casing to the sole plate assembly.

The outer frame 1100 has a plurality of protrusions 1300 extending inwardly towards the centre of the frame. The ring member 1105 has a plurality of corresponding protrusions 1301 which in use engage the protrusions 1300 on the frame. As the sole plate is slid relative to the upper casing, the protrusions on the frame and ring engage each other, locking the upper casing of the iron to the frame, and at the same time pressing down on the resilient seal member 1103 which secures the sole plate 1102 in the retaining ring.

The "U" shaped seal 1120 which holds the glass cover plate 1104 in place is assembled to the upper casing, prior to sliding the upper casing over the sole plate assembly.

Figure 14:
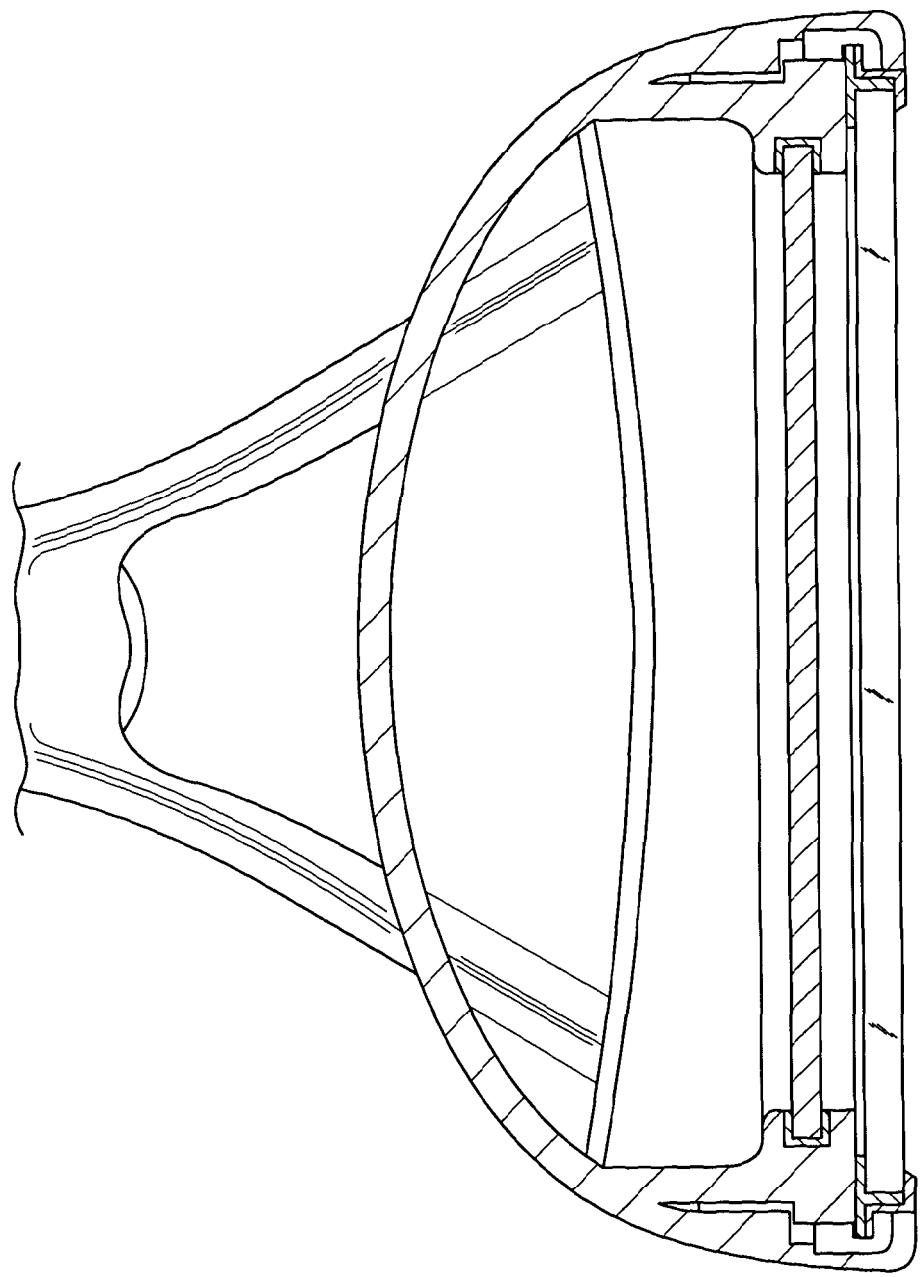
FIG. 14 illustrates schematically in cut away view from the front, a sole plate assembly and casing of an iron as herein described.

Referring to FIG. 14 herein, there is illustrated schematically in cut away view the complete casing and sole plate assembly in assembled form.

The invention claimed is:

1. A sole plate assembly for an electric hand iron, said sole plate assembly comprising:
    a metal outer frame member;
    a metal retaining ring member shaped to fit inside said metal outer frame member;
    a flat sole plate member shaped to fit in said metal retaining ring member; and
    a flexible seal member arranged to locate in said metal retaining ring member.

2. The sole plate assembly as claimed in claim 1, further comprising an upper cover plate arranged to locate adjacent said flat sole plate member, such as to provide a void space between said sole plate member and said upper cover plate.

3. The sole plate assembly as claimed in any one of the preceding claims, wherein said cover plate locates on top of said seal member.

4. The sole plate as claimed in any one of the preceding claims, wherein said metal retaining strip member forms a ring of a shape configured to surround said flat sole plate member.

5. The sole plate as claimed in any one of the preceding claims, wherein said metal retaining strip comprises:
    a first substantially flat portion;
    a second substantially flat portion spaced apart from said first substantially flat portion; and
    an up right portion joining said first and second substantially flat portions together and extending there between.

6. The sole plate assembly as claimed in claim 5, wherein said second substantially flat portion has a lower face which is arranged in use to be substantially in a same plane as a lower face of said outer metal frame member.

7. The sole plate assembly as claimed in claim 5 or 6, wherein:
    said second substantially flat portion of said retaining ring extends inwardly of said upright portion towards a centre of said retaining ring; and
    when assembled, said sole plate rests on said second flat portion.

8. The sole plate as claimed in any one of the preceding claims wherein, a lower face of said sole plate is recessed relative to a lower face of said outer frame.

9. The sole plate assembly as claimed in any one of the preceding claims, wherein a lower face of said sole plate is recessed relative to a lower face of said outer frame by a distance in the range 0.3 mm to 1.0 mm.

10. The sole plate assembly as claimed in any one of the preceding claims, wherein said metal retaining ring member is configured to fit between said seal member and said outer metal frame member.

11. The sole plate as claimed in any one of the preceding claims, wherein said seal member locates between said retaining ring and said sole plate member.

12. The sole plate assembly as claimed in any one of the preceding claims, wherein said seal member comprises a flexible heat resistant material.

13. The sole plate assembly as claimed in any one of the preceding claims, wherein said seal comprises a silicone rubber material.

14. The sole plate assembly as claimed in any one of the preceding claims, wherein said seal member has a cross sectional shape comprising:
    a first portion, extending in a direction transverse to a main plane of said sole plate; and
    a second portion extending in direction transverse to said first portion.

15. The sole plate assembly as claimed in any one of the preceding claims, wherein said seal member has a substantially "T" shaped cross section.

16. The sole plate assembly as claimed in any one of the preceding claims, wherein said sole plate member comprises a plurality of thin film heating elements for directly heating said sole plate member.

17. The sole plate assembly as claimed in any one of the preceding claims, wherein said sole plate member has a thickness in the range 3.5 mm to 4.5 mm.

18. The sole plate assembly as claimed in claim 17, wherein said sole plate member has a thickness in the range 3.9 mm to 4.1 mm.

19. The sole plate assembly as claimed in any one of the preceding claims, wherein said sole plate comprises a glass plate.

20. The sole plate assembly as claimed in any one of the preceding claims, wherein said sole plate comprises a ceramic material.

21. The sole plate assembly as claimed in any one of the preceding claims, wherein said sole plate member comprises a plurality of thin film heating elements having dimensions in the range:
   width: 0.1 mm to 15.0 mm; and
   thickness: 300 μm to 400 μm.

22. The sole plate as claimed in any one of the preceding claims, wherein said sole plate member comprises a plurality of thin film heating elements having a width dimension in the range 1.0 mm to 5.0 mm.

23. The sole plate assembly as claimed in any one of the preceding claims, wherein said sole plate member comprises a plurality of substantially transparent heating elements.

24. An electric hand iron comprising a sole plate assembly as claimed in any one of the preceding claims.

25. The electric hand iron as claimed in claim 24, wherein said sole plate assembly is retained to said body without the need for adhesives.

26. The electric hand iron as claimed in claim 24 or 25, further comprising a body which fits over said sole plate assembly, wherein:
   said body comprises a set of one or a plurality of first recesses or protrusions;
   said outer frame member comprises a corresponding set of one or a plurality of second recesses or protrusions;
   said first set of recesses or protrusions being arranged to engage with said second set of recesses or protrusions to secure said body to said outer frame member;
   wherein said retaining ring member, said sole plate member, and said seal member are held together between said outer metal frame and said body.

27. A method of construction of a sole plate assembly for an iron, said method comprising:
   inserting a metal retaining strip member into an outer metal frame member;
   inserting a flat sole plate member into said metal retaining ring; and
   inserting a seal member into said outer metal frame member.

28. A method as claimed in claim 27, comprising inserting said seal member between said retaining ring and said flat sole plate member.

29. The method as claimed in claim 27 or 28, wherein said flat sole plate member comprises a plurality of thin film electric heating elements; and
   said seal member serves to electrically isolate said electric heating elements from said outer metal frame member.

30. The method as claimed in any one of claims 27 to 28, further comprising inserting a glass or ceramic cover plate on top of said seal member and above said sole plate member, such that said cover plate is secured above said sole plate member and between said body and said outer frame member.

31. The method as claimed in any one of claims 27 to 30, further comprising attaching said outer metal frame to an upper body member in such a manner that said upper body member secures said metal retaining strip member, said seal member and said sole plate member together within said outer frame member.

32. The method as claimed in any one of claims 27 to 31, further comprising sliding said outer metal frame, said metal retaining strip, said sole plate member and said seal into an upper body member, in a direction from a rear of said body member towards a front of said body member.

* * * * *

UNITED STATES PATENT AND TRADEMARK OFFICE
CERTIFICATE OF CORRECTION

| | | |
|---|---|---|
| PATENT NO. | : 8,756,840 B2 | Page 1 of 4 |
| APPLICATION NO. | : 13/879357 | |
| DATED | : June 24, 2014 | |
| INVENTOR(S) | : George Ralph Adkins et al. | |

It is certified that error appears in the above-identified patent and that said Letters Patent is hereby corrected as shown below:

On the title page, under Abstract "32 claims, 14 drawing sheets" should be deleted and replaced with "31 claims, 14 drawing sheets".

In the Claims

Claims 1-32 should be deleted and replaced with the following claims 1-31:

1. A sole plate assembly for an electric hand iron, said sole plate assembly comprising:
a metal outer frame member;
a metal retaining strip member shaped to fit inside said metal outer frame member;
a flat glass or ceramic sole plate member shaped to fit in said metal retaining strip member; and
a flexible seal member arranged to locate in said metal retaining strip member;
wherein said metal retaining strip member locates within said metal outer frame, said glass or ceramic sole plate member locates within said metal retaining strip member, and said flexible seal member locates between said glass or ceramic sole plate member and said metal outer frame member.

2. The sole plate assembly as claimed in claim 1, further comprising an upper cover plate arranged to locate adjacent said flat sole plate member, such as to provide a void space between said sole plate member and said upper cover plate.

3. The sole plate assembly as claimed in claim 1, comprising an upper cover plate, wherein said upper cover plate locates on top of said seal member.

4. The sole plate as claimed in claim 1, wherein said metal retaining strip member comprises a ring of a shape configured to surround said flat sole plate member.

5. The sole plate as claimed in claim 1, wherein said metal retaining strip member comprises;
a first substantially flat portion;
a second substantially flat portion spaced apart from said first substantially flat portion; and Signed and Sealed this
Third Day of February, 2015

Michelle K. Lee
*Deputy Director of the United States Patent and Trademark Office* an up right portion joining said first and second substantially flat portions together and extending there between.

6. The sole plate assembly as claimed in claim 1, wherein said metal retaining strip member comprises:
a first substantially flat portion;
a second substantially flat portion spaced apart from said first substantially flat portion; and
an up right portion joining said first and second substantially flat portions together and extending there between
wherein said second substantially flat portion has a lower face which is arranged in use to be substantially in a same plane as a lower face of said outer metal frame member.

7. The sole plate assembly as claimed in claim 1, wherein said metal retaining strip member comprises:
a first substantially flat portion;
a second substantially flat portion spaced apart from said first substantially flat portion; and
an up right portion joining said first and second substantially flat portions together and extending there between;
said second substantially flat portion of said retaining strip extends inwardly of said up right portion towards a centre of said retaining strip; and
when assembled, said sole plate member rests on said second flat portion.

8. The sole plate as claimed in claim 1 wherein said sole plate member comprises a lower face, and said metal outer frame comprises a lower face, and said lower face of said sole plate member is recessed relative to said lower face of said metal outer frame.

9. The sole plate assembly as claimed in claim 1, wherein said sole plate member comprises a lower face, and said metal outer frame 300 comprises a lower face, wherein said lower face of said sole plate member is recessed relative to said lower face of said metal outer frame by a distance in the range 0.3 mm to 1.0 mm.

10. The sole plate assembly as claimed in claim 1, wherein said metal retaining strip member is configured to fit between said seal member and said metal outer frame member.

11. The sole plate as claimed in claim 1, wherein said seal member locates between said metal retaining strip and said sole plate member.

12. The sole plate assembly as claimed in claim 1, wherein said seal member comprises a flexible heat resistant material.

13. The sole plate assembly as claimed in claim 1, wherein said seal member comprises a silicone rubber material.

14. The sole plate assembly as claimed in claim 1, wherein said seal member has a cross sectional shape comprising:

a first portion, extending in a direction transverse to a main plane of said sole plate; and
a second portion extending in direction transverse to said first portion.

15. The sole plate assembly as claimed in claim 1, wherein said seal member has a substantially "T" shaped cross section.

16. The sole plate assembly as claimed in claim 1, wherein said sole plate member comprises a plurality of thin film heating elements for directly heating said sole plate member.

17. The sole plate assembly as claimed in claim 1, wherein said sole plate member has a thickness in the range 3.5 mm to 4.5 mm.

18. The sole plate assembly as claimed in claim 1, wherein said sole plate member has a thickness in the range 3.9 mm to 4.1 mm.

19. The sole plate assembly as claimed in claim 1, wherein said sole plate member comprises a glass plate.

20. The sole plate assembly as claimed in claim 1, wherein said sole plate member comprises a ceramic material.

21. The sole plate assembly as claimed in claim 1, wherein said sole plate member comprises a plurality of thin film heating elements each having dimensions in the range:
width: 0.1 mm to 15.0 mm; and
thickness: 300 $\mu$m to 400 $\mu$m.

22. The sole plate assembly as claimed in claim 1, wherein said sole plate member comprises a plurality of thin film heating elements each having a width dimension in the range 1.0 mm to 5.0 mm.

23. The sole plate assembly as claimed in claim 1, wherein said sole plate member comprises a plurality of substantially transparent heating elements.

24. An electric hand iron comprising a sole plate assembly as claimed in claim 1.

25. An electric hand iron comprising a sole plate assembly as claimed in claim 1, further comprising a body which fits over said sole plate assembly, wherein:
said body comprises a set of one or a plurality of first recesses or protrusions;
said metal outer frame member comprises a corresponding set of one or a plurality of second recesses or protrusions;
said first set of recesses or protrusions being arranged to engage with said second set of recesses or protrusions to secure said body to said metal outer frame member;
wherein said retaining strip member, said sole plate member, and said seal member are held together between said outer metal frame member and said body.

26. A method of construction of a sole plate assembly for an iron, said method comprising:
inserting a metal retaining strip member into an outer metal frame member;
inserting a flat glass or ceramic sole plate member into said metal retaining strip member; and
inserting a seal member into said outer metal frame member,
such that said metal retaining strip member locates within said metal outer frame, said glass or ceramic sole plate member locates within said metal retaining strip member, and said flexible seal member locates between said glass or ceramic sole plate member and said metal outer frame member.

27. The method as claimed in claim 26, comprising inserting said seal member between said metal retaining strip member and said flat sole plate member.

28. The method as claimed in claim 26, wherein said flat sole plate member comprises a plurality of thin film electric heating elements; and
said seal member serves to electrically isolate said electric heating elements from said outer metal frame member.

29. The method as claimed in claim 26, further comprising inserting a glass or ceramic cover plate on top of said seal member and above said sole plate member, such that said cover plate is secured above said sole plate member and between said body and said outer metal frame member.

30. The method as claimed in claim 26, further comprising attaching said outer metal frame member to an upper body member in such a manner that said upper body member secures said metal retaining strip member, said seal member and said sole plate member together within said outer metal frame member.

31. The method as claimed in claim 26, further comprising sliding said outer metal frame member, said metal retaining strip member, said sole plate member and said seal member into an upper body member, in a direction from a rear of said body member towards a front of said body member.